(12) United States Patent
Mao et al.

(10) Patent No.: US 12,358,832 B2
(45) Date of Patent: Jul. 15, 2025

(54) GLASS AND GLASS PRODUCT

(71) Applicant: CDGM GLASS CO., LTD, Sichuan (CN)

(72) Inventors: Lulu Mao, Chengdu (CN); Xuemei Chen, Chengdu (CN); Bo Kuang, Chengdu (CN); Liangzhen Hao, Chengdu (CN)

(73) Assignee: CDGM GLASS CO., LTD, Sichuan (CN)

( * ) Notice: Subject to any disclaimer, the term of this patent is extended or adjusted under 35 U.S.C. 154(b) by 749 days.

(21) Appl. No.: 17/604,674

(22) PCT Filed: Apr. 2, 2020

(86) PCT No.: PCT/CN2020/082900
§ 371 (c)(1),
(2) Date: Oct. 18, 2021

(87) PCT Pub. No.: WO2020/220923
PCT Pub. Date: Nov. 5, 2020

(65) Prior Publication Data
US 2022/0212979 A1    Jul. 7, 2022

(30) Foreign Application Priority Data
Apr. 29, 2019    (CN) .......................... 201910354561.4

(51) Int. Cl.
| | | |
|---|---|---|
| C03C 3/093 | (2006.01) | |
| B29D 11/00 | (2006.01) | |
| C03C 4/20 | (2006.01) | |
| C03C 21/00 | (2006.01) | |
| G02B 1/02 | (2006.01) | |

(52) U.S. Cl.
CPC .......... *C03C 3/093* (2013.01); *B29D 11/0048* (2013.01); *C03C 4/20* (2013.01); *C03C 21/002* (2013.01); *B29K 2909/08* (2013.01); *C03C 2204/00* (2013.01); *G02B 1/02* (2013.01)

(58) Field of Classification Search
CPC .......... C03C 3/078; C03C 3/085; C03C 3/093
See application file for complete search history.

(56) References Cited

U.S. PATENT DOCUMENTS

| | | | |
|---|---|---|---|
| 3,429,742 A  * | 2/1969 | Grego ................... | C03C 21/008 65/30.13 |
| 3,790,260 A | 2/1974 | Boyd et al. | |
| 3,951,671 A | 4/1976 | Parry et al. | |
| 5,843,856 A  * | 12/1998 | Suha ...................... | C03C 3/093 313/493 |
| 7,858,546 B2 | 12/2010 | Miyauchi et al. | |
| 2008/0213495 A1 | 9/2008 | Miyauchi et al. | |

FOREIGN PATENT DOCUMENTS

| | | | | |
|---|---|---|---|---|
| CN | 101250025 A | | 8/2008 | |
| CN | 102858707 A | * | 1/2013 | ............. C03C 17/04 |
| CN | 109987839 A | | 7/2019 | |
| JP | H11-191212 A | | 7/1999 | |
| WO | 98/50315 A1 | | 11/1998 | |

OTHER PUBLICATIONS

Jun. 30, 2020 International Search Report issued in International Patent Application No. PCT/CN2020/082900.

* cited by examiner

*Primary Examiner* — Elizabeth A. Bolden
(74) *Attorney, Agent, or Firm* — Oliff PLC

(57) ABSTRACT

A glass with high thermal expansion coefficient and excellent thermal shock resistance, wherein the glass includes the following components by mole percentage: 55-80% of $SiO_2$; 0-10% of $B_2O_3$; 0-10% of $Al_2O_3$; 2-20% of ZnO; 0-15% of MgO; and no more than 30% of $Li_2O+Na_2O+K_2O$. Through the reasonable proportioning of components, the glass has high thermal expansion coefficient and excellent thermal shock resistance at the same time. The glass is suitable for chemical strengthening, and the glass product obtained after chemical strengthening has large surface stress and large depth of stress layer.

34 Claims, No Drawings

GLASS AND GLASS PRODUCT

TECHNICAL FIELD

The invention relates to a glass, in particular to a glass and glass product with high thermal expansion coefficient and excellent thermal shock resistance.

TECHNICAL FIELD

In recent years, the aspheric spectacle lens with refractive index greater than 1.70 and multi-focus aspheric resin spectacle lens have been widely used in the field of myopia correction.

The current mainstream method for producing resin lens is to inject the molten resin into the upper and lower moulds designed as per the curvature of spectacle lens, and separate the upper and lower moulds after the resin cooling to obtain the satisfactory resin spectacle lens. The quality and yield of resin lens depend on the material and design of the injection mould.

The glass precision compression mould generally applies silicon carbide or tungsten carbide, but this material has much lower thermal expansion coefficient than resin material, so it is difficult to obtain high surface quality in resin injection molding process. More importantly, the processing of the above mould material is expensive and precision machining is required for the mould design, so it is too expensive for injection molding of small-batch and multi-specification spectacle lens products. However, the glass mould blank can be obtained by compression, and the surface design of the mould can be obtained by grinding and polishing, thus the comprehensive cost is significantly reduced when compared with the silicon carbide mould.

Not all glass can be used as resin mould, and the glass with large expansion coefficient is benefit for improving the surface quality of resin lens. However, in the prior art, the glass with large expansion coefficient often has low thermal shock resistance. The glass mould is subjected to strong thermal shock in the injection molding process, especially in the cooling process. The glass mould will crack in case of poor thermal shock resistance, so the glass for resin lens mould needs excellent thermal shock resistance. Therefore, the purpose of glass research and development is to develop a glass with high thermal expansion coefficient and thermal shock resistance at the same time.

On the other hand, the surface stress of the mould can be further enhanced by chemical strengthening of the glass, so as to resist the thermal shock and pressure shock during injection molding. For this reason, the application prospects of the glass can be increased if the developed glass is available for chemical strengthening and has excellent chemical strengthening performance.

SUMMARY

The technical problem to be solved by the present invention is to provide a glass with high thermal expansion coefficient and excellent thermal shock resistance.

To solve the technical problem, the technical scheme of the present invention provides:

(1) A glass, comprising the following components by mole percentage: 55-80% of $SiO_2$; 0-10% of $B_2O_3$; 0-10% of $Al_2O_3$; 2-20% of ZnO; 0-15% of MgO; and no more than 30% of $Li_2O+Na_2O+K_2O$.

(2) The glass according to claim 1, further comprising the following components by mole percentage: 0-6% of $TiO_2$; and/or 0-5% of $ZrO_2$; and/or 0-10% of CaO; and/or 0-10% of SrO; and/or 0-10% of BaO; and/or 0-1% of $Sb_2O_3$.

(3) A glass, comprising $SiO_2$, ZnO, alkaline-earth metal oxide and alkali metal oxide by mole percentage: 55-80% of $SiO_2$; 2-20% of ZnO; and no more than 30% of $Li_2O+Na_2O+K_2O$, wherein the value of $(Na_2O+K_2O)/ZnO$ is 0.4-10.

(4) The glass according to item (3), further comprising the following components by mole percentage: 0-10% of $B_2O_3$; 0-10% of $Al_2O_3$; 0-6% of $TiO_2$; 0-15% of MgO; 0-5% of $ZrO_2$; 0-10% of CaO; 0-10% of SrO; 0-10% of BaO; and 0-1% of $Sb_2O_3$.

(5) The glass according to any of items (1)-(4), comprising the following components by mole percentage: 58-75% of $SiO_2$; and/or 0.1-10% of $B_2O_3$; and/or 0.5-8% of $Al_2O_3$; and/or 0.1-6% of $TiO_2$; and/or 5-15% of ZnO; and/or 1-10% of MgO; and/or no more than 25% of $Li_2O+Na_2O+K_2O$; and/or 0-3% of $ZrO_2$; and/or 0-5% of CaO; and/or 0-5% of SrO; and/or 0-5% of BaO; and/or 0-0.8% of $Sb_2O_3$.

(6) The glass according to any of items (1)-(4), wherein the component thereof is expressed in mole percentage, and the value of $B_2O_3/SiO_2$ is 0.002-0.1, preferably 0.005-0.08, more preferably 0.005-0.06.

(7) The glass according to any of items (1)-(4), wherein the component thereof is expressed in mole percentage, and the value of $B_2O_3/Al_2O_3$ is 0.1-5, preferably 0.2-3, more preferably 0.25-2.

(8) The glass according to any of items (1)-(4), wherein the component thereof is expressed in mole percentage, and the value of $Al_2O_3/TiO_2$ is 0.2-18, preferably 0.5-10, more preferably 0.5-6.

(9) The glass according to any of items (1)-(4), wherein the component thereof is expressed in mole percentage, and the value of $(Al_2O_3+TiO_2)/SiO_2$ is 0.01-0.2, preferably 0.02-0.15, more preferably 0.02-0.1.

(10) The glass according to any of items (1)-(4), wherein the component thereof is expressed in mole percentage, and the value of $MgO/B_2O_3$ is 1-20, preferably 2-10, more preferably 3-8.

(11) The glass according to any of items (1)-(4), wherein the component thereof is expressed in mole percentage, and the value of $Na_2O/K_2O$ is 0.3-6, preferably 0.4-4, more preferably 0.5-3.

(12) The glass according to any of items (1)-(4), wherein the component thereof is expressed in mole percentage, and the value of $(Na_2O+K_2O)/SiO_2$ is 0.1-0.4, preferably 0.12-0.35, more preferably 0.15-0.32.

(13) The glass according to any of items (1)-(4), wherein the component thereof is expressed in mole percentage, and the value of $(Na_2O+K_2O)/ZnO$ is 0.4-10, preferably 0.5-8, more preferably 1-5.

(14) The glass according to any of items (1)-(4), wherein the component thereof is expressed in mole percentage, and the value of $K_2O/(MgO+CaO)$ is 0.2-8, preferably 0.5-5, more preferably 0.7-3.

(15) The glass according to any of items (1)-(4), comprising the following components by mole percentage: 60-73% of $SiO_2$; and/or 0.1-6% of $B_2O_3$; and/or 1-5% of $Al_2O_3$; and/or 0.2-5% of $TiO_2$; and/or 6-12% of ZnO; and/or 2-9% of MgO; and/or 0-3% of CaO; and/or 0-3% of SrO; and/or 0-3% of BaO; and/or no more than 20% of $Li_2O+Na_2O+K_2O$; and/or 0-0.5% of $Sb_2O_3$.

(16) The glass according to any of items (1)-(4), comprising the following components by mole percentage: 0.5-4% of $B_2O_3$; and/or 0.3-3% of $TiO_2$; and/or 3-8% of MgO; and/or no more than 18% of $Li_2O+Na_2O+K_2O$.

(17) The glass according to any of items (1)-(4), comprising the following components by mole percentage: 0-10% of $Li_2O$, preferably 0-5% of $Li_2O$, more preferably 0-3% of $Li_2O$; and/or 3-15% of $Na_2O$, preferably 4-12% of $Na_2O$, more preferably 5-11% of $Na_2O$; and/or 2-12% of $K_2O$, preferably 3-10% of $K_2O$, more preferably 4-9% of $K_2O$.

(18) The glass according to any of items (1)-(4), wherein the thermal expansion coefficient $\alpha_{100/300°\ C.}$ of the glass is above $85\times10^{-7}$/K, preferably above $90\times10^{-7}$/K, more preferably above $92\times10^{-7}$/K, further preferably above $94\times10^{-7}$/K; and/or the water resistance stability $D_W$ is above Class 2, preferably Class 1; and/or the acid resistance stability $D_A$ is above Class 2, preferably Class 1; and/or the cracking temperature is above 170° C., preferably above 180° C., more preferably above 190° C., further preferably above 200° C.; and/or the transition temperature $T_g$ is above 530° C., preferably above 535° C., more preferably above 540° C., further preferably above 545° C.; and/or the bubble degree is above Class A, preferably above Class $A_0$; and/or the stripe degree is above Class C, preferably above Class B.

(19) A glass product, made of the glass according to any of items (1)-(18) by chemical strengthening.

(20) A glass product, comprising the following components by mole percentage: 55-80% of $SiO_2$; 0-10% of $B_2O_3$; 0-10% of $Al_2O_3$; 2-20% of ZnO; 0-15% of MgO; no more than 30% of $Li_2O+Na_2O+K_2O$; 0-6% of $TiO_2$; 0-5% of $ZrO_2$; 0-10% of CaO; 0-10% of SrO; 0-10% of BaO; and 0-1% of $Sb_2O_3$.

(21) The glass product according to item (20), wherein the component thereof is expressed in mole percentage, satisfying one or more of the following 10 situations:

1) the value of $(Na_2O+K_2O)/SiO_2$ is 0.1-0.4, preferably 0.12-0.35, more preferably 0.15-0.32;
2) the value of $B_2O_3/Al_2O_3$ is 0.1-5, preferably 0.2-3, more preferably 0.25-2;
3) the value of $Al_2O_3/TiO_2$ is 0.2-18, preferably 0.5-10, more preferably 0.5-6;
4) the value of $(Al_2O_3+TiO_2)/SiO_2$ is 0.01-0.2, preferably 0.02-0.15, more preferably 0.02-0.1;
5) the value of $MgO/B_2O_3$ is 1-20, preferably 2-10, more preferably 3-8;
6) the value of $Na_2O/K_2O$ is 0.3-6, preferably 0.4-4, more preferably 0.5-3;
7) the value of $B_2O_3/SiO_2$ is 0.002-0.1, preferably 0.005-0.08, more preferably 0.005-0.06;
8) the value of $(Na_2O+K_2O)/ZnO$ is 0.4-10, preferably 0.5-8, more preferably 1-5;
9) the value of $K_2O/(MgO+CaO)$ is 0.2-8, preferably 0.5-5, more preferably 0.7-3;
10) the value of $Li_2O+Na_2O+K_2O$ is no more than 25%, preferably no more than 20%, more preferably no more than 18%.

(22) The glass product according to item (20), comprising the following components by mole percentage: 58-75% of $SiO_2$, preferably 60-73%; and/or 0.1-10% of $B_2O_3$, preferably 0.1-6%, more preferably 0.5-4%; and/or 0.5-8% of $Al_2O_3$, preferably 1-5%; and/or 5-15% of ZnO, preferably 6-12%; and/or 1-10% of MgO, preferably 2-9%, more preferably 3-8%; and/or 0.1-6% of $TiO_2$, preferably 0.2-5%, more preferably 0.3-3%; and/or 0-3% of $ZrO_2$; and/or 0-5% of CaO, preferably 0-3%; and/or 0-5% of SrO, preferably 0-3%; and/or 0-5% of BaO, preferably 0-3%; and/or 0-10% of $Li_2O$, preferably 0-5%, more preferably 0-3%; and/or 3-15% of $Na_2O$, preferably 4-12%, more preferably 5-11%; and/or 2-12% of $K_2O$, preferably 3-10%, more preferably 4-9%; and/or 0-0.8% of $Sb_2O_3$, preferably 0-0.5%.

(23) The glass product according to any of items (20)-(22), wherein the thermal expansion coefficient $\alpha_{100/300°\ C.}$ is above $85\times10^{-7}$/K, preferably above $90\times10^{-7}$/K, more preferably above $92\times10^{-7}$/K, further preferably above $94\times10^{-7}$/K; and/or the water resistance stability $D_W$ is above Class 2, preferably Class 1; and/or the acid resistance stability $D_A$ is above Class 2, preferably Class 1; and/or the cracking temperature is above 170° C., preferably above 180° C., more preferably above 190° C., further preferably above 200° C.; and/or the transition temperature $T_g$ is above 530° C., preferably above 535° C., more preferably above 540° C., further preferably above 545° C.; and/or the bubble degree is above Class A, preferably above Class $A_0$; and/or the stripe degree is above Class C, preferably above Class B.

(24) The glass product according to any of items (19)-(22), wherein the surface stress Cs is above 600 MPa, preferably above 620 MPa, more preferably above 630 MPa, further preferably above 640 MPa; and/or the depth of stress layer DoL is above 35 nm, preferably above 40 nm, more preferably above 45 nm, further preferably above 50 nm.

(25) A glass preform, made of the glass according to any of items (1)-(18); or made of the glass product according to any of items (19)-(24).

(26) An optical element, made of the glass according to any of items (1)-(18); or made of the glass product according to any of items (19)-(24); or made of the glass preform according to item (25).

(27) An optical instrument, made of the glass according to any of items (1)-(18); or made of the glass product according to any of items (19)-(24); or made of the glass preform according to item (25); or made of the optical element according to item (26).

(28) A lens mould, made of the glass according to any of items (1)-(18); or made of the glass product according to any of items (19)-(24).

(29) Application of the glass according to any of items (1)-(18) or the glass product according to any of items (19)-(24) in electronic equipment or display equipment, or application in encapsulation or sealing between metals.

The excellent effect of the present invention is that: through the reasonable proportioning of components, the glass obtained by the present invention has high thermal expansion coefficient and excellent thermal shock resistance at the same time. The glass of the present invention is suitable for chemical strengthening, and the glass product obtained after chemical strengthening has large surface stress and large depth of stress layer.

DETAILED DESCRIPTION

The implementations of the glass and glass products of the present invention will be described in detail below, but the present invention is not limited to the following implementations. Appropriate changes may be made within the scope of the purpose of the present invention for implementation. In addition, the repeated descriptions will not limit the aim of the invention although with appropriate omissions.

In the following paragraphs, the range of components of the glass and glass products provided by the present invention will be described. If not specified herein, the content of each component and the total content are expressed in mole percentage relative to the total glass materials converted into oxide composition. "Converted into oxide composition" therein refers to that the total molar amount of this oxide is taken as 100% when the oxide, compound salt and hydroxide, used as raw materials for the composition of glass or glass products of the present invention, are decomposed and transformed into oxides during melting. The "glass" herein refers to the glass before chemical strengthening, and the glass after chemical strengthening herein refers to "glass product".

Unless otherwise noted in specific circumstances, the numerical range listed herein includes upper and lower limits, and the words "above" and "below" include the endpoint values as well as all integers and fractions within the range, but not limited to the specific values listed when the range is limited. "And/or" mentioned herein is inclusive. For example, "A and/or B" refers to only A, or only B, or both A and B.

$SiO_2$ is a basic component for forming the glass in the present invention. If the content thereof is over 80%, the glass will become refractory and easily produce bubble, stone or other inclusions in the product, thus failing to meet the requirements for inherent quality; meanwhile, the thermal expansion coefficient of the glass will decrease sharply and fail to meet the design requirements. If the content thereof is less than 55%, the water resistance and acid resistance of the glass will be below the design requirements, and the thermal shock resistance of the glass will fail to meet the design requirements. Therefore, the content thereof is 55-80%, preferably 58-75%, more preferably 60-73%.

The addition of $B_2O_3$ in the glass can reduce the melting temperature and improve the inherent quality of the glass. If the content of $B_2O_3$ is over 10% in the present invention, the chemical strengthening performance of the glass will degrade rapidly, thus the content of $B_2O_3$ in the present invention is 0-10%. In some implementations of the present invention, the introduction of above 0.1% of $B_2O_3$ is benefit for strengthening the glass network structure, so as to further improve the water resistance and acid resistance of the glass. In particular, when the content of $B_2O_3$ is above 0.5%, the "cylinder" problem of the glass can be effectively solved to improve the internal quality of the glass, thus the content of $B_2O_3$ is preferably 0.1-10%, more preferably 0.1-6%, further preferably 0.5-4%.

In some implementations of the present invention, the ratio of $B_2O_3/SiO_2$ is strongly related to the chemical strengthening performance and inherent quality of the glass. If this ratio is less than 0.002, the melting performance of the glass deteriorates dramatically, resulting in the failure to meet the internal bubble mass requirements of the glass; if the content thereof is higher than 0.1, the chemical strengthening performance of the glass degrades sharply, and in particular, the depth of stress layer of glass products cannot meet the design requirements. Therefore, the ratio thereof is confined to 0.002-0.1, preferably 0.005-0.08, further preferably 0.005-0.06.

Adding an appropriate amount of $Al_2O_3$ into the glass can improve the chemical strengthening performance of the glass, and meanwhile, improve the chemical stability of the glass; if the content thereof is over 10%, the chemical strengthening performance of the glass degrades, and the glass is difficult to melt so as to reduce the inherent quality of the glass, thus the content of $Al_2O_3$ is below 10%. In some implementations, if the content of $Al_2O_3$ is less than 0.5%, the effect of improving chemical strengthening is not obvious. Therefore, the content of $Al_2O_3$ is confined to 0-10%, preferably 0.5-8%, further preferably 1-5%.

Adding a small amount of $ZrO_2$ into the glass can increase the chemical stability of the glass, especially the water resistance of the glass, and meanwhile increase the thermal shock resistance of the glass. However, the aggregation thereof is rather strong, and the addition thereof into the glass will reduce the thermal expansion coefficient quickly, especially when the added amount is above 5%. Therefore, the content thereof is confined to 0-5%, preferably 0-3%, further preferably 0%.

Through researches, the inventor found that in some implementations, when $B_2O_3$ and $Al_2O_3$ coexist in the glass, the relative content thereof has great influence on the thermal shock resistance of the glass. When the value of $B_2O_3/Al_2O_3$ is greater than 5 or less than 0.1, the thermal shock resistance of the glass degrades and the cracking temperature decreases sharply. Therefore, the value of $B_2O_3/Al_2O_3$ in the present invention is preferably controlled as 0.1-5, more preferably 0.2-3, and further preferably 0.25-2.

Adding an appropriate amount of $TiO_2$ into the glass can increase the internal network compactness of the glass, so as to improve the thermal shock resistance and chemical stability of the glass. If the content thereof is higher than 6%, the thermal expansion coefficient of the glass will be reduced and fail to meet the design requirements, thus the content of $TiO_2$ is 0-6%. In some implementations, if the content of $TiO_2$ is less than 0.1%, the effect of improving thermal shock resistance and chemical stability of the glass is not obvious. Therefore, the content of $TiO_2$ is preferably 0.1-6%, more preferably 0.2-5%, further preferably 0.3-3%.

In some implementations, the ratio of $Al_2O_3/TiO_2$ has great influence on the chemical strengthening of the glass, especially on the surface stress (Cs) of glass products. When the ratio thereof is less than 0.2 or greater than 18, the surface stress of glass products reduces sharply. Therefore, the value of $Al_2O_3/TiO_2$ is confined to 0.2-18, preferably 0.5-10, more preferably 0.5-6.

In some implementations, the ratio of $(Al_2O_3+TiO_2)/SiO_2$ has great influence on the thermal expansion coefficient of the glass. When the ratio thereof is greater than 0.2, although the chemical stability of the glass improves slightly, the thermal expansion coefficient thereof will decrease rapidly, so as to fail to meet the design requirements. If the ratio thereof is less than 0.01, the thermal shock resistance of the glass will degrade significantly. Therefore, the value of $(Al_2O_3+TiO_2)/SiO_2$ is 0.01-0.2, preferably 0.02-0.15, more preferably 0.02-0.1.

Adding an appropriate amount of ZnO into the glass can make the glass structure more compact, improve the chemical stability of the glass, and increase the corrosion resistance of the glass against water and acid solutions during cleaning. In addition, a certain amount of ZnO can increase the viscosity of the glass during molding, so as to effectively eliminate the internal stripe of the glass. If the content thereof is higher than 20%, the thermal expansion coefficient of the glass reduces rapidly and fails to meet the design requirements. If the content thereof is less than 2%, the water and acid resistance performance of the glass degrades, and at the same time, the glass is easy to produce stripes during production. Therefore, the content thereof is confined to 2-20%, preferably 5-15%, more preferably 6-12%.

MgO, CaO, SrO and BaO belong to alkaline-earth metal oxides. From the perspective of production process performance, adding such alkaline-earth metal oxides into the glass can adjust the devitrification performance and high-temperature viscosity of the glass, so as to easily obtain the glass with satisfactory bubble and stripe quality during production. However, through researches, the inventor found that the effect of adding MgO can obtain the best effect from the perspective of improving the thermal shock resistance of the glass. The ability of the other three alkaline-earth metal oxides to improve the thermal shock resistance of the glass is far inferior to that of MgO, SrO and BaO, or even the thermal shock resistance may be damaged. Therefore, the alkaline-earth metal oxidation of the glass provided by the present invention is dominated by MgO. In case of surplus thermal shock resistance, a small amount of alkaline-earth metal oxides such as CaO, SrO and BaO can be added to optimize the devitrification resistance, high-temperature viscosity, bubble degree, stripe degree and other properties.

By adding less than 15% of MgO in the present invention, the above properties can be obtained while preventing the glass instability due to excessive addition of MgO. In some implementations, if the added amount of MgO is less than 1%, the effect of improving thermal shock resistance of the glass is not obvious; if the content thereof is higher than 10%, the glass becomes extremely unstable. Therefore, the content of MgO is 0-15%, preferably 1-10%, more preferably 2-9%, further preferably 3-8%.

In some implementations, the ratio of $MgO/B_2O_3$ has great influence on the thermal shock resistance of the glass; if the ratio thereof is less than 1, the thermal shock resistance of the glass fails to meet the design requirements. If the ratio thereof is higher than 20, the thermal shock resistance of the glass degrades, and meanwhile the devitrification resistance degrades significantly. Therefore, the ratio of $MgO/B_2O_3$ is 1-20, preferably 2-10, more preferably 3-8.

In case of surplus thermal shock resistance of the glass, a small amount of CaO can be considered to be added to adjust the melting performance and high-temperature viscosity of the glass, so as to further improve the bubble (inclusion) level and stripe level of the glass. However, if the content thereof is over 10%, the thermal shock resistance of the glass will degrade rapidly. Therefore, the content of CaO is confined to 0-10%, preferably 0-5%, more preferably 0-3%, further preferably 0%.

In case of large surplus thermal shock resistance of the glass, a small amount of BaO or SrO can be added to improve the melting performance and high-temperature viscosity of the glass, preferably using SrO. But if the content of SrO is over 10%, the thermal shock resistance of the glass degrades quickly, thus the content of SrO is confined to 0-10%, preferably 0-5%, more preferably 0-3%, further preferably 0%. If BaO is used, the content thereof is confined to 0-10%, preferably 0-5%, more preferably 0-3%, further preferably 0%.

Adding $Li_2O$, $Na_2O$ and $K_2O$, alkali metal oxides, into the glass can reduce the high-temperature viscosity of the glass, and easily obtain the products almost without bubble and inclusion. If the total content thereof is over 30%, the chemical stability of the glass decreases sharply, and the glass becomes extremely unstable. Therefore, the total content of $Li_2O$, $Na_2O$ and $Na_2O$ ($Li_2O+Na_2O+K_2O$) is no more than 30%, preferably no more than 25%, more preferably no more than 20%, further preferably no more than 18%.

Through a large number of tests, the inventor found that the relative content of the above alkali metal oxides is closely related to the thermal shock resistance, thermal expansion coefficient and chemical strengthening performance of the glass.

Adding a small amount of $Li_2O$ into the glass can rapidly reduce the high-temperature viscosity and melting temperature of the glass, effectively improve the internal indicators such as bubble, stone and stripe of the glass, and in addition, improve the thermal shock resistance of the glass when compared with the other two alkali metal oxides. However, if the content thereof is over 10%, the transition temperature of the glass decreases rapidly and fails to meet the requirements. Therefore, the added amount of $Li_2O$ is 0-10%, preferably 0-5%, more preferably 0-3%, further preferably 0%.

Adding a small amount of $Na_2O$ into the glass can rapidly improve the chemical strengthening performance of the glass, enhance the thermal expansion coefficient of the glass, and meanwhile make the glass structure more compact with the help of the free oxygen provided by $Na_2O$, so as to increase the thermal shock resistance of the glass. If the content thereof is less than 3%, the above effect is not obvious, and meanwhile the viscosity of the glass increases sharply, so that it is difficult to obtain the glass with high inherent quality; if the content thereof is over 15%, the thermal shock resistance of the glass degrades significantly and the chemical stability of the glass decreases significantly. Therefore, the content of $Na_2O$ is confined to 3-15%, preferably 4-12%, more preferably 5-11%.

Adding a small amount of $K_2O$ into the glass can promote the improvement of chemical strengthening performance of the glass, and significantly enhance the thermal expansion coefficient of the glass. If the content thereof is less than 2%, the above effect is not obvious; if the content thereof is higher than 12%, the chemical stability of the glass decreases rapidly, and meanwhile the glass will become extremely unstable. Therefore, the content of $K_2O$ is 2-12%, preferably 3-10%, more preferably 4-9%.

Through researches, the inventor found that complex synergistic effects will be formed when $Na_2O$ and $K_2O$ coexist. In some implementations, when the value of $Na_2O/K_2O$ is 0.3-6, preferably 0.4-4, further preferably 0.5-3, the chemical strengthening performance, thermal shock resistance and chemical stability of the glass will be in the optimal state at the same time.

The ratio of $(Na_2O+K_2O)/SiO_2$ has great influence on the thermal expansion coefficient, thermal shock resistance and internal quality of the glass. In some implementations, when the value of $(Na_2O+K_2O)/SiO_2$ is less than 0.1, the glass becomes more viscous, the internal quality such as bubble and stripe becomes poor, and meanwhile the thermal expansion coefficient of the glass decreases, failing to meet the design requirements; when the value of $(Na_2O+K_2O)/SiO_2$ is greater than 0.4, the devitrification resistance of the glass becomes poor, and the thermal shock resistance of the glass degrades rapidly. Therefore, the value of $(Na_2O+K_2O)/SiO_2$ is 0.1-0.4, preferably 0.12-0.35, more preferably 0.15-0.32.

In some implementations, the ratio of $(Na_2O+K_2O)/ZnO$ has great influence on the chemical strengthening performance and thermal shock resistance of the glass, and especially on the depth of stress layer of glass products. When the value of $(Na_2O+K_2O)/ZnO$ is less than 0.4, the depth of stress layer of the glass fails to meet the design requirements; when the value of $(Na_2O+K_2O)/ZnO$ is greater than 10, the thermal shock resistance of the glass degrades rapidly, failing to meet the design requirements. Therefore, the value of $(Na_2O+K_2O)/ZnO$ is 0.4-10, preferably 0.5-8, more preferably 1-5.

In some implementations, the ratio of $K_2O/(MgO+CaO)$ is strongly related to the devitrification resistance and depth of stress layer of the glass. If the ratio thereof is less than 0.2, the depth of stress layer of glass products fails to meet the design requirements; if the ratio thereof is greater than 8, the devitrification resistance of the glass becomes poor, failing to meet the requirements for secondary compression. Therefore, the ratio of $K_2O/(MgO+CaO)$ is 0.2-8, preferably 0.5-5, more preferably 0.7-3.

$Sb_2O_3$ is a clarifying agent, which is easier to eliminate bubbles when added in the glass. The content thereof in the present invention is confined to 0-1%, preferably 0-0.8%, further preferably 0-0.5%.

In the following paragraphs, the properties of glass and glass products provided by the present invention will be described:

[Thermal Expansion Coefficient]

The thermal expansion coefficient ($\alpha_{100/300°\ C.}$) of the glass or glass products at 100° C.-300° C. is tested as per the method specified in GB/T 7962.16-2010.

The thermal expansion coefficient ($\alpha_{100/300°\ C.}$) of the glass or glass products provided by the present invention is above $85\times10^{-7}$/K, preferably over $90\times10^{-7}$/K, more preferably over $92\times10^{-7}$/K, further preferably over $94\times10^{-7}$/K.

[Water Resistance Stability]

The water resistance stability ($D_W$) of the glass or glass products is tested as per the method specified in GB/T 17129.

The water resistance stability ($D_W$) of the glass or glass products provided by the present invention is above Class 2, preferably Class 1.

[Acid Resistance Stability]

The acid resistance stability ($D_A$) of the glass or glass products is tested as per the method specified in GB/T 17129.

The acid resistance stability ($D_A$) of the glass or glass products provided by the present invention is above Class 2, preferably Class 1.

[Thermal Shock Resistance]

The thermal shock resistance of the glass or glass products is tested by water cooling method: process the glass sample into a wafer with a diameter of 30 mm and a thickness of 2 mm, and grind the surface to be smooth. Place the processed glass wafer into a heating furnace to heat to the preset temperature, keep warm for 5 minutes from 100° C., and then take out and put into a 10° C. cold water after the glass wafer has uniform temperature. If without crack in the glass, increase the furnace temperature by 10° C. and carry out the above test until the glass wafer is put into the cold water and cracks. At this moment, the temperature of the heating furnace is recorded as "cracking temperature". The higher the cracking temperature, the stronger the thermal shock resistance of the glass.

The cracking temperature of the glass or glass products provided by the present invention is above 170° C., preferably above 180° C., more preferably above 190° C., further preferably above 200° C.

[Transition Temperature]

The transition temperature ($T_g$) of the glass or glass products is tested as per the method specified in GB/T 7962.16-2010.

The transition temperature ($T_g$) of the glass or glass products provided by the present invention is above 530° C., preferably above 535° C., more preferably above 540° C., further preferably above 545° C.

[Devitrification Resistance]

The devitrification resistance test method of the glass or glass products is as follows: cut the sample glass into 20×20×10 mm pieces, place into a muffle furnace with temperature as $T_g+230°$ C. for 30 minutes, then take out and place in heat preservation cotton for annealing, and observe the surface devitrification after the cooling. If the cooled glass has obvious devitrification, the devitrification resistance of the glass is poor, which is recorded as "B"; if the cooled glass does not have obvious devitrification, the devitrification resistance of the glass can meet the requirements for secondary compression, which is recorded as "A".

The devitrification resistance of the glass or glass products provided by the present invention can achieve Grade A and meet the needs for blank production by secondary compression.

[Bubble Degree]

The bubble degree (including inclusion) of the glass or glass products is measured and classified as per the test method specified in GB/T7962.8-2010.

The bubble degree of the glass or glass products provided by the present invention is above Class A, preferably above Class $A_0$.

[Stripe Degree]

The stripe degree of the glass or glass products is compared with the standard sample, by a stripe instrument composed of a point light source and a lens, from the direction where the stripe is most easily seen. The stripe degree is divided into four levels as shown in Table 1.

TABLE 1

| Class | Stripe degree |
|---|---|
| A | Without visible stripe under specified testing conditions |
| B | With small and scattered stripes under specified testing conditions |
| C | With slightly parallel stripes under specified testing conditions |
| D | With roughly parallel stripes under specified testing conditions |

The stripe degree of the glass or glass products provided by the present invention is above Class C, preferably above Class B.

<Manufacturing Method of Glass>

The glass in the present invention is manufactured as follows: weigh based on the ratios, mix the ordinary raw materials for the glass (such as oxide, hydroxide, carbonate and nitrate), place the mixed raw materials in a platinum crucible, melt for 2.5-4 h at 1320-1420° C., obtain homogeneous melted glass without bubbles and undissolved substances after clarification, stirring and homogenization, shape this molten glass in a mould and perform annealing.

<Manufacturing Method of Glass Products>

The glass obtained by the present invention is processed into a preform, and is then subject to chemical strengthening. The chemical strengthening in the present invention refers to ion exchange method, by which the glass of the present invention can have ion exchange through the methods known to the technical field. In the process of ion exchange, the smaller metal ions in the glass are substituted or "exchanged" by larger metal ions with the same valence state near the glass. The substitution of smaller ions with larger ions can construct the compressive stress in the glass, so as to form the compressive stress layer.

In some implementations, metal ions belong to monovalent alkali metal ions (such as $Na^+$, $K^+$, $Rb^+$ and $Cs^+$), and the ion exchange is carried out by immersing the glass in the salt bath of at least one molten salt containing larger metal ions. These larger metal ions are used to substitute the smaller metal ions in the glass. Or other monovalent metal ions, such as $Ag^+$, $Tl^+$ and $Cu^+$, can also be used for exchange. One or more ion exchange process for glass products may include but are not limited to: immersing in a single salt bath, or immersing in multiple salt baths with the same or different composition, and conducting washing and/or annealing between the immersions.

In some implementations, the glass can have ion exchange by immersing in the salt bath of molten Na salt (e.g. $NaNO_3$) at the temperature of about 420° C.-480° C. for about 4-20 hours. In this implementation, Na ion substitutes some Li ions in the glass, so as to form the surface compression layer. In some implementations, the ion exchange can be carried out for the implementation by immersing the glass in the salt bath of molten K salt (e.g. $KNO_3$) at the temperature of about 420° C.-480° C. for about 4-20 hours.

In some implementations, the methods include the ion implantation method for implanting the ions in the surface of the glass, and thermal strengthening method for heating the glass and then cooling the glass rapidly.

In addition to the above properties, the glass products obtained by the present invention have the properties as below:

[Surface Stress and Depth of Stress Layer]

Process the glass into 30×30×3 mm pieces with two-sided polishing, then place into a salt bath (including 99.5% potassium nitrate and 0.5% additive) for 16-hour chemical strengthening at 450° C., and then test the surface stress (Cs) and the depth of stress layer (DoL) of glass products with a FSM6000LE tester.

The surface stress (Cs) of the glass product provided by the present invention is above 600 MPa, preferably above 620 MPa, more preferably above 630 MPa, further preferably above 640 MPa.

The depth of stress layer (DoL) of the glass product provided by the present invention is above 35 nm, preferably above 40 nm, more preferably above 45 nm, further preferably above 50 nm.

Both the glass and glass products of the present invention can be used to make glass preform, optical element, optical instrument and lens (e.g. resin spectacle lens) mould.

The glass preform can be made from the glass or glass products formed by, for example, grinding or re-thermoforming, precision stamping and other compression molding means. That is to say, the glass preform can be made by grinding the glass or glass products and other machining methods, or the glass preform can be made by making a preform for molding with the glass or glass products, re-thermoforming this preform, and then grinding this preform, or the glass preform can be made by precision stamping of the preform made by grinding.

It should be noted that the means for preparing glass preform is not limited to the above means. As mentioned above, the glass or glass products of the present invention is useful for various optical elements and optical designs, wherein the particularly preferred method is to form a preform by the glass or glass products of the present invention, and use this preform for re-thermoforming, precision stamping and the like to make optical elements such as lenses and prisms.

The glass preform and the optical element of the present invention are both formed by the glass or glass products of the present invention described above. The glass preform of the present invention has excellent characteristics of the glass or glass products; the optical element of the present invention has excellent characteristics of the glass or glass products, and can provide such optical elements as various lenses and prisms having a high optical value.

Examples of the lens include various lenses with spherical or aspheric surfaces, such as concave meniscus lens, convex meniscus lens, biconvex lens, biconcave lens, planoconvex lens and planoconcave lens.

The optical element formed by the glass or glass products of the present invention can make optical instruments such as photographic equipment, camera equipment, display equipment and monitoring equipment.

The glass or glass products of the present invention can be applied in electronic equipment or display equipment, such as mobile phone, watch, computer and touch screen.

The glass or glass products of the present invention can be applied for sealing or encapsulation between metals, such as sealing or encapsulation between platinum, iron nickel alloy, iron nickel chromium alloy, etc.

Embodiment

To further understand the technical solution of the present invention, embodiments of the glass and glass products provided in the present invention are now described. What shall be noted is that these embodiments do not limit the scope of the present invention.

<Glass Embodiment>

This embodiment obtains the glass shown in Table 1-Table 2 by the above manufacturing method of glass. In addition, the properties of each glass are tested as per the method specified in the present invention, and the test results are indicated in Table 1-Table 2. For the composition of Embodiments 1-15 of the present invention, K1 is the value of $B_2O_3/SiO_2$; K2 is the value of $B_2O_3/Al_2O_3$; K3 is the value of $Al_2O_3/TiO_2$; K4 is the value of $(Al_2O_3+TiO_2)/SiO_2$; K5 is the value of $MgO/B_2O_3$; K6 is the value of $Li_2O+Na_2O+K_2O$; K7 is the value of $Na_2O/K_2O$; K8 is the value of $(Na_2O+K_2O)/SiO_2$; K9 is the value of $(Na_2O+K_2O)/ZnO$; and K10 is the value of $K_2O/(MgO+CaO)$.

TABLE 1

| Component/mol % | 1 | 2 | 3 | 4 | 5 | 6 | 7 | 8 | 9 | 10 |
|---|---|---|---|---|---|---|---|---|---|---|
| $SiO_2$ | 67.4 | 55.0 | 56.5 | 59.2 | 63.5 | 69.7 | 70.3 | 75.2 | 77.4 | 79.2 |
| $B_2O_3$ | 1.0 | 2.0 | 3.0 | 2.0 | 2.5 | 1.3 | 1.8 | 0.5 | 2.0 | 2.0 |
| $Al_2O_3$ | 1.9 | 2.5 | 3.5 | 2.3 | 3.0 | 1.9 | 0.6 | 0.9 | 0.7 | 0.5 |
| $TiO_2$ | 0.6 | 1.2 | 0.2 | 3.2 | 0.5 | 0.8 | 2.1 | 0.8 | 0.6 | 0.5 |
| $ZrO_2$ | 0.0 | 0.2 | 0.0 | 0.0 | 0.0 | 0.0 | 0.5 | 0.2 | 0.1 | 0.0 |
| ZnO | 9.0 | 14.5 | 13.5 | 12.7 | 9.0 | 10.0 | 11.7 | 5.5 | 6.0 | 5.0 |
| MgO | 5.2 | 9.5 | 8.7 | 8.0 | 5.0 | 6.0 | 4.6 | 9.6 | 5.0 | 3.1 |
| CaO | 0.0 | 1.0 | 0.0 | 0.0 | 0.0 | 1.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| SrO | 0.0 | 0.0 | 0.0 | 0.0 | 0.0 | 0.0 | 0.0 | 0.0 | 0.0 | 0.0 |
| $K_2O$ | 6.5 | 7.0 | 10.0 | 6.0 | 7.0 | 4.5 | 3.9 | 3.0 | 3.8 | 3.5 |
| $Na_2O$ | 8.3 | 7.0 | 4.5 | 6.5 | 9.3 | 4.7 | 4.4 | 4.2 | 4.3 | 6.1 |
| $Li_2O$ | 0.0 | 0.0 | 0.0 | 0.0 | 0.1 | 0.0 | 0.0 | 0.0 | 0.0 | 0.0 |
| $Sb_2O_3$ | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 |
| K1 | 0.01 | 0.04 | 0.05 | 0.03 | 0.04 | 0.02 | 0.03 | 0.01 | 0.03 | 0.03 |
| K2 | 0.53 | 0.80 | 0.86 | 0.87 | 0.83 | 0.68 | 3.00 | 0.56 | 2.86 | 4.00 |
| K3 | 3.17 | 2.08 | 17.50 | 0.72 | 6.00 | 2.38 | 0.29 | 1.13 | 1.17 | 1.00 |
| K4 | 0.04 | 0.07 | 0.07 | 0.09 | 0.06 | 0.04 | 0.04 | 0.02 | 0.02 | 0.01 |

TABLE 1-continued

| Component/mol % | 1 | 2 | 3 | 4 | 5 | 6 | 7 | 8 | 9 | 10 |
|---|---|---|---|---|---|---|---|---|---|---|
| K5 | 5.20 | 4.75 | 2.90 | 4.00 | 2.00 | 4.62 | 2.56 | 19.20 | 2.50 | 1.55 |
| K6 | 14.80 | 14.00 | 14.50 | 12.50 | 16.40 | 9.20 | 8.30 | 7.20 | 8.10 | 9.60 |
| K7 | 1.28 | 1.00 | 0.45 | 1.08 | 1.33 | 1.04 | 1.13 | 1.40 | 1.13 | 1.74 |
| K8 | 0.22 | 0.25 | 0.26 | 0.21 | 0.26 | 0.13 | 0.12 | 0.10 | 0.10 | 0.12 |
| K9 | 1.64 | 0.97 | 1.07 | 0.98 | 1.81 | 0.92 | 0.71 | 1.31 | 1.35 | 1.92 |
| K10 | 1.25 | 0.67 | 1.15 | 0.75 | 1.40 | 0.64 | 0.85 | 0.31 | 0.76 | 1.13 |
| Devitrification resistance | A | A | A | A | A | A | A | A | A | A |
| $T_g$ (° C.) | 550 | 535 | 539 | 552 | 530 | 571 | 576 | 610 | 617 | 621 |
| $\alpha_{100/300°\ C.}$ (×$10^{-7}$/K) | 96.0 | 100.1 | 99.8 | 96.8 | 100.6 | 92.1 | 91.1 | 86.7 | 86.4 | 86.8 |
| $D_W$ | 1 | 1 | 1 | 1 | 1 | 1 | 1 | 1 | 1 | 1 |
| $D_A$ | 1 | 1 | 1 | 1 | 1 | 1 | 1 | 1 | 1 | 1 |
| Cracking temperature (° C.) | 200 | 200 | 210 | 200 | 200 | 220 | 230 | 230 | 230 | 230 |
| Bubble degree | $A_{00}$ | $A_{00}$ | $A_{00}$ | $A_{00}$ | $A_{00}$ | $A_{00}$ | $A_0$ | $A_0$ | $A_0$ | $A_0$ |
| Stripe degree | B | B | B | B | B | B | B | C | C | C |

TABLE 2

| Component/mol % | 11 | 12 | 13 | 14 | 15 |
|---|---|---|---|---|---|
| $SiO_2$ | 66.4 | 67.9 | 68.5 | 66.4 | 66.6 |
| $B_2O_3$ | 2.0 | 0.6 | 1.0 | 1.0 | 1.5 |
| $Al_2O_3$ | 1.9 | 1.7 | 1.7 | 1.9 | 0.8 |
| $TiO_2$ | 0.6 | 0.9 | 0.9 | 0.6 | 1.2 |
| $ZrO_2$ | 0.0 | 0.1 | 0.1 | 0.0 | 0.0 |
| ZnO | 9.0 | 9.5 | 12.0 | 9.0 | 11.0 |
| MgO | 5.0 | 3.8 | 4.9 | 8.0 | 3.5 |
| CaO | 0.2 | 0.0 | 0.0 | 0.0 | 0.0 |
| BaO | 0.0 | 0.1 | 0.0 | 0.0 | 0.0 |
| SrO | 0.0 | 0.5 | 0.0 | 0.0 | 0.0 |
| $K_2O$ | 6.5 | 6.0 | 4.0 | 6.0 | 7.0 |
| $Na_2O$ | 8.3 | 8.8 | 6.8 | 7.0 | 8.3 |
| $Li_2O$ | 0.0 | 0.0 | 0.0 | 0.0 | 0.0 |
| $Sb_2O_3$ | 0.1 | 0.1 | 0.1 | 0.1 | 0.1 |
| Total | 100.0 | 100.0 | 100.0 | 100.0 | 100.0 |
| K1 | 0.03 | 0.01 | 0.01 | 0.02 | 0.02 |
| K2 | 1.05 | 0.35 | 0.59 | 0.53 | 1.88 |
| K3 | 3.17 | 1.89 | 1.89 | 3.17 | 0.67 |
| K4 | 0.04 | 0.04 | 0.04 | 0.04 | 0.03 |
| K5 | 2.50 | 6.33 | 4.90 | 8.00 | 2.33 |
| K6 | 14.80 | 14.80 | 10.80 | 13.00 | 15.30 |
| K7 | 1.28 | 1.47 | 1.70 | 1.17 | 1.19 |
| K8 | 0.22 | 0.22 | 0.16 | 0.20 | 0.23 |
| K9 | 1.64 | 1.56 | 0.90 | 1.44 | 1.39 |
| K10 | 1.25 | 1.58 | 0.82 | 0.75 | 2.00 |
| Devitrification resistance | A | A | A | A | A |
| $T_g$ (° C.) | 550 | 548 | 550 | 550 | 550 |
| $\alpha_{100/300°\ C.}$ (×$10^{-7}$/K) | 95.8 | 95.4 | 93.0 | 93.6 | 98.9 |
| $D_W$ | 1 | 1 | 1 | 1 | 1 |
| $D_A$ | 1 | 1 | 1 | 1 | 1 |
| Cracking temperature (° C.) | 200 | 190 | 210 | 200 | 200 |
| Bubble degree | $A_{00}$ | $A_{00}$ | $A_{00}$ | $A_{00}$ | $A_{00}$ |
| Stripe degree | B | B | B | B | B |

<Glass Product Embodiment>

The glass of Embodiments 1-15 obtained in Table 1-Table 2 is made into glass products according to the above manufacturing method of glass products. The surface stress and depth of stress layer thereof are tested, and the results are listed in Table 3-Table 4.

TABLE 3

| Component/mol % | 1 | 2 | 3 | 4 | 5 | 6 | 7 | 8 | 9 | 10 |
|---|---|---|---|---|---|---|---|---|---|---|
| $SiO_2$ | 67.4 | 55.0 | 56.5 | 59.2 | 63.5 | 69.7 | 70.3 | 75.2 | 77.4 | 79.2 |
| $B_2O_3$ | 1.0 | 2.0 | 3.0 | 2.0 | 2.5 | 1.3 | 1.8 | 0.5 | 2.0 | 2.0 |
| $Al_2O_3$ | 1.9 | 2.5 | 3.5 | 2.3 | 3.0 | 1.9 | 0.6 | 0.9 | 0.7 | 0.5 |
| $TiO_2$ | 0.6 | 1.2 | 0.2 | 3.2 | 0.5 | 0.8 | 2.1 | 0.8 | 0.6 | 0.5 |
| $ZrO_2$ | 0.0 | 0.2 | 0.0 | 0.0 | 0.0 | 0.0 | 0.5 | 0.2 | 0.1 | 0.0 |
| ZnO | 9.0 | 14.5 | 13.5 | 12.7 | 9.0 | 10.0 | 11.7 | 5.5 | 6.0 | 5.0 |
| MgO | 5.2 | 9.5 | 8.7 | 8.0 | 5.0 | 6.0 | 4.6 | 9.6 | 5.0 | 3.1 |
| CaO | 0.0 | 1.0 | 0.0 | 0.0 | 0.0 | 1.0 | 0.0 | 0.0 | 0.0 | 0.0 |
| BaO | 0.0 | 0.0 | 0.0 | 0.0 | 0.0 | 0.0 | 0.0 | 0.0 | 0.0 | 0.0 |
| SiO | 0.0 | 0.0 | 0.0 | 0.0 | 0.0 | 0.0 | 0.0 | 0.0 | 0.0 | 0.0 |
| $K_2O$ | 6.5 | 7.0 | 10.0 | 6.0 | 7.0 | 4.5 | 3.9 | 3.0 | 3.8 | 3.5 |
| $Na_2O$ | 8.3 | 7.0 | 4.5 | 6.5 | 9.3 | 4.7 | 4.4 | 4.2 | 4.3 | 6.1 |
| $Li_2O$ | 0.0 | 0.0 | 0.0 | 0.0 | 0.1 | 0.0 | 0.0 | 0.0 | 0.0 | 0.0 |
| $Sb_2O_3$ | 0.1 | 0.1 | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 | 100.0 | 100.0 |
| Cs (Mpa) | 670 | 652 | 658 | 655 | 648 | 653 | 661 | 652 | 651 | 642 |
| DoL (nm) | 60 | 56 | 56 | 53 | 50 | 52 | 56 | 53 | 52 | 52 |

TABLE 4

| Component/mol % | 11 | 12 | 13 | 14 | 15 |
|---|---|---|---|---|---|
| $SiO_2$ | 66.4 | 67.9 | 68.5 | 66.4 | 66.6 |
| $B_2O_3$ | 2.0 | 0.6 | 1.0 | 1.0 | 1.5 |
| $Al_2O_3$ | 1.9 | 1.7 | 1.7 | 1.9 | 0.8 |
| $TiO_2$ | 0.6 | 0.9 | 0.9 | 0.6 | 1.2 |
| $ZrO_2$ | 0.0 | 0.1 | 0.1 | 0.0 | 0.0 |
| ZnO | 9.0 | 9.5 | 12.0 | 9.0 | 11.0 |
| MgO | 5.0 | 3.8 | 4.9 | 8.0 | 3.5 |
| CaO | 0.2 | 0.0 | 0.0 | 0.0 | 0.0 |
| BaO | 0.0 | 0.1 | 0.0 | 0.0 | 0.0 |
| SrO | 0.0 | 0.5 | 0.0 | 0.0 | 0.0 |
| $K_2O$ | 6.5 | 6.0 | 4.0 | 6.0 | 7.0 |
| $Na_2O$ | 8.3 | 8.8 | 6.8 | 7.0 | 8.3 |
| $Li_2O$ | 0.0 | 0.0 | 0.0 | 0.0 | 0.0 |
| $Sb_2O_3$ | 0.1 | 0.1 | 0.1 | 0.1 | 0.1 |
| Total | 100.0 | 100.0 | 100.0 | 100.0 | 100.0 |
| Cs (Mpa) | 668 | 665 | 661 | 659 | 667 |
| DoL (nm) | 59 | 57 | 55 | 58 | 61 |

The invention claimed is:

1. A glass, comprising the following components by mole percentage: 55-80% of $SiO_2$; 0.1-10% of $B_2O_3$; 0-10% of $Al_2O_3$; 2-20% of ZnO; 1-15% of MgO; and no more than 30% of $Li_2O+Na_2O+K_2O$, wherein the value of $B_2O_3/Al_2O_3$ is 0.53-5, and the value of $MgO/B_2O_3$ is 1-20.

2. The glass according to claim 1, further comprising the following components by mole percentage: 0-6% of $TiO_2$; and/or 0-5% of $ZrO_2$; and/or 0-10% of CaO; and/or 0-10% of SrO; and/or 0-10% of BaO; and/or 0-1% of $Sb_2O_3$.

3. The glass according to claim 1, comprising the following components by mole percentage: 58-75% of $SiO_2$; and/or 0.5-8% of $Al_2O_3$; and/or 0.1-6% of $TiO_2$; and/or 5-15% of ZnO; and/or 1-10% of MgO; and/or no more than 25% of $Li_2O+Na_2O+K_2O$; and/or 0-3% of $ZrO_2$; and/or 0-5% of CaO; and/or 0-5% of SrO; and/or 0-5% of BaO; and/or 0-0.8% of $Sb_2O_3$.

4. The glass according to claim 1, comprising the following components by mole percentage: 60-73% of $SiO_2$; and/or 0.1-6% of $B_2O_3$; and/or 1-5% of $Al_2O_3$; and/or 0.2-5% of $TiO_2$; and/or 6-12% of ZnO; and/or 2-9% of MgO; and/or 0-3% of CaO; and/or 0-3% of SrO; and/or 0-3% of BaO; and/or no more than 20% of $Li_2O+Na_2O+K_2O$; and/or 0-0.5% of $Sb_2O_3$.

5. The glass according to claim 1, comprising the following components by mole percentage: 0.5-4% of $B_2O_3$; and/or 0.3-3% of $TiO_2$; and/or 3-8% of MgO; and/or no more than 18% of $Li_2O+Na_2O+K_2O$.

6. The glass according to claim 1, comprising the following components by mole percentage: 0-10% of $Li_2O$; and/or 3-15% of $Na_2O$; and/or 2-12% of $K_2O$.

7. The glass according to claim 1, comprising the following components by mole percentage: 0-3% of $Li_2O$; and/or 5-11% of $Na_2O$; and/or 4-9% of $K_2O$.

8. The glass according to claim 1, wherein the component thereof is expressed in mole percentage, and the value of $B_2O_3/SiO_2$ is 0.002-0.1.

9. The glass according to claim 1, wherein the component thereof is expressed in mole percentage, and the value of $B_2O_3/Al_2O_3$ is 0.53-3.

10. The glass according to claim 1, wherein the component thereof is expressed in mole percentage, and the value of $Al_2O_3/TiO_2$ is 0.2-18.

11. The glass according to claim 1, wherein the component thereof is expressed in mole percentage, and the value of $(Al_2O_3+TiO_2)/SiO_2$ is 0.01-0.2.

12. The glass according to claim 1, wherein the component thereof is expressed in mole percentage, and the value of $Na_2O/K_2O$ is 0.3-6.

13. The glass according to claim 1, wherein the component thereof is expressed in mole percentage, and the value of $(Na_2O+K_2O)/SiO_2$ is 0.1-0.4.

14. The glass according to claim 1, wherein the component thereof is expressed in mole percentage, and the value of $(Na_2O+K_2O)/ZnO$ is 0.4-10.

15. The glass according to claim 1, wherein the component thereof is expressed in mole percentage, and the value of $K_2O/(MgO+CaO)$ is 0.2-8.

16. The glass according to claim 1, wherein the component thereof is expressed in mole percentage, and the value of $B_2O_3/SiO_2$ is 0.005-0.06; and/or the value of $B_2O_3/Al_2O_3$ is 0.53-2; and/or the value of $Al_2O_3/TiO_2$ is 0.5-6; and/or the value of $(Al_2O_3+TiO_2)/SiO_2$ is 0.02-0.1; and/or the value of $MgO/B_2O_3$ is 3-8; and/or the value of $Na_2O/K_2O$ is 0.5-3; and/or the value of $(Na_2O+K_2O)/SiO_2$ is 0.15-0.32; and/or the value of $(Na_2O+K_2O)/ZnO$ is 1-5; and/or the value of $K_2O/(MgO+CaO)$ is 0.7-3.

17. The glass according to claim 1, wherein the thermal expansion coefficient (100/300° C. of the glass is above 85×10"/K; and/or the water resistance stability $D_W$ is above Class 2; and/or the acid resistance stability $D_A$ is above Class 2; and/or the cracking temperature is above 170° C.; and/or the transition temperature $T_g$ is above 530° C.; and/or the bubble degree is above Class A; and/or the stripe degree is above Class C.

18. The glass according to claim 1, wherein the thermal expansion coefficient $\alpha_{100/300°\ C.}$ of the glass is above 94×10$^{-7}$/K; and/or the water resistance stability $D_W$ is above Class 1; and/or the acid resistance stability $D_A$ is above Class 1; and/or the cracking temperature is above 200° C.; and/or the transition temperature $T_g$ is above 545° C.; and/or the bubble degree is above Class $A_0$; and/or the stripe degree is above Class B.

19. A glass product, made of the glass according to claim 1 that has been subjected to chemical strengthening.

20. A glass preform, made of the glass; or made of a glass product made of the glass that has been subjected to chemical strengthening; wherein the glass is the glass according to claim 1.

21. An optical element, made of the glass; or made of a glass product made of the glass that has been subjected to chemical strengthening; or made of a glass preform made of the glass or made of the glass that has been subjected to chemical strengthening; wherein the glass is the glass according to claim 1.

22. An optical instrument, made of the glass; or made of a glass product made of the glass that has been subjected to chemical strengthening; or made of a glass preform made of the glass or made of a glass product made of the glass that has been subjected to chemical strengthening; or made of an optical element made of the glass, or made of a glass product made of the glass that has been subjected to chemical strengthening, or made of a glass preform made of the glass or made of a glass product made of the glass that has been subjected to chemical strengthening; wherein the glass is the glass according to claim 1.

23. A lens mould, made of the glass; or made of a glass product made of the glass that has been subjected to chemical strengthening; wherein the glass is the glass according to claim 1.

24. An electronic equipment, a display equipment, an encapsulation, or a sealing between metal comprising the glass; or a glass product made of the glass that has been subjected to chemical strengthening; wherein the glass is the glass according to claim 1.

25. A glass, comprising $SiO_2$, ZnO, alkaline-earth metal oxide and alkali metal oxide by mole percentage: 0.1-10% of $B_2O_3$; 0-10% of $Al_2O_3$; 55-80% of $SiO_2$; 2-20% of ZnO; and no more than 30% of $Li_2O+Na_2O+K_2O$, wherein the value of $(Na_2O+K_2O)/ZnO$ is 0.4-10, and the value of $B_2O_3/Al_2O_3$ is 0.53-5, and the value of $MgO/B_2O_3$ is 1-20.

26. The glass according to claim 25, further comprising the following components by mole percentage: 0-6% of $TiO_2$; 1-15% of MgO; 0-5% of $ZrO_2$; 0-10% of CaO; 0-10% of SrO; 0-10% of BaO; and 0-1% of $Sb_2O_3$.

27. A glass product, comprising the following components by mole percentage: 55-80% of $SiO_2$; 0.1-10% of $B_2O_3$; 0-10% of $Al_2O_3$; 2-20% of ZnO; 1-15% of MgO; no more than 30% of $Li_2O+Na_2O+K_2O$; 0-6% of $TiO_2$; 0-5% of $ZrO_2$; 0-10% of CaO; 0-10% of SrO; 0-10% of BaO; and 0-1% of $Sb_2O_3$, wherein the value of $B_2O_3/Al_2O_3$ is 0.53-5, and the value of $MgO/B_2O_3$ is 1-20.

28. The glass product according to claim 27, comprising the following components by mole percentage: 58-75% of $SiO_2$; and/or 0.1-10% of $B_2O_3$; and/or 0.5-8% of $Al_2O_3$; and/or 5-15% of ZnO; and/or 1-10% of MgO; and/or 0.1-6% of $TiO_2$; and/or 0-3% of $ZrO_2$; and/or 0-5% of CaO; and/or 0-5% of SrO; and/or 0-5% of BaO; and/or 0-10% of $Li_2O$; and/or 3-15% of $Na_2O$; and/or 2-12% of $K_2O$; and/or 0-0.8% of $Sb_2O_3$.

29. The glass product according to claim 27, comprising the following components by mole percentage: 60-73% of $SiO_2$; and/or 0.5-4% of $B_2O_3$; and/or 1-5% of $Al_2O_3$; and/or 6-12% of ZnO; and/or 3-8% of MgO; and/or 0.3-3% of $TiO_2$; and/or 0-3% of CaO; and/or 0-3% of SrO; and/or 0-3% of BaO; and/or 0-3% of $Li_2O$; and/or 5-11% of $Na_2O$; and/or 4-9% of $K_2O$; and/or 0-0.5% of $Sb_2O_3$.

30. The glass product according to claim 27, wherein the component thereof is expressed in mole percentage, satisfying one or more of the following situations:

the value of $(Na_2O+K_2O)/SiO_2$ is 0.1-0.4;
the value of $B_2O_3/Al_2O_3$ is 0.53-3;
the value of $Al_2O_3/TiO_2$ is 0.2-18;
the value of $(Al_2O_3+TiO_2)/SiO_2$ is 0.01-0.2;
the value of $Na_2O/K_2O$ is 0.3-6;
the value of $B_2O_3/SiO_2$ is 0.002-0.1;
the value of $(Na_2O+K_2O)/ZnO$ is 0.4-10;
the value of $K_2O/(MgO+CaO)$ is 0.2-8;
the value of $Li_2O+Na_2O+K_2O$ is no more than 25%.

31. The glass product according to claim 27, wherein the component thereof is expressed in mole percentage, satisfying one or more of the following situations:
1) the value of $(Na_2O+K_2O)/SiO_2$ is 0.15-0.32;
2) the value of $B_2O_3/Al_2O_3$ is 0.53-2;
3) the value of $Al_2O_3/TiO_2$ is 0.5-6;
4) the value of $(Al_2O_3+TiO_2)/SiO_2$ is 0.02-0.1;
5) the value of $MgO/B_2O_3$ is 3-8;
6) the value of $Na_2O/K_2O$ is 0.5-3;
7) the value of $B_2O_3/SiO_2$ is 0.005-0.06;
8) the value of $(Na_2O+K_2O)/ZnO$ is 1-5;
9) the value of $K_2O/(MgO+CaO)$ is 0.7-3;
10) the value of $Li_2O+Na_2O+K_2O$ is no more than 18%.

32. The glass product according to claim 27, wherein the thermal expansion coefficient $\alpha_{100/300° C.}$ of the glass product is above $85\times10^{-7}$/K; and/or the water resistance stability $D_W$ is above Class 2; and/or the acid resistance stability $D_A$ is above Class 2; and/or the cracking temperature is above 170° C.; and/or the transition temperature $T_g$ is above 530° C.; and/or the bubble degree is above Class A; and/or the stripe degree is above Class C.

33. The glass product according to claim 27, wherein the surface stress Cs of the glass product is above 600 MPa; and/or the depth of stress layer DoL is above 35 nm.

34. The glass product according to claim 27, wherein the thermal expansion coefficient $\alpha_{100/300° C.}$ of the glass product is above $94\times10^{-7}$/K; and/or the water resistance stability $D_W$ is above Class 1; and/or the acid resistance stability $D_A$ is above Class 1; and/or the cracking temperature is above 200° C.; and/or the transition temperature $T_g$ is above 545° C.; and/or the bubble degree is above Class $A_0$; and/or the stripe degree is above Class B; and/or the surface stress Cs of the glass product is above 640 MPa; and/or the depth of stress layer DoL is above 50 nm.

\* \* \* \* \*